J. M. BURBY.
APPARATUS FOR REMOVING IMPURITIES FROM PULPED WASTE PAPERS.
APPLICATION FILED APR. 28, 1911.

1,013,529.

Patented Jan. 2, 1912.

2 SHEETS—SHEET 1.

Witnesses:
Charles C. Abbe
Veronica Braun

John M. Burby, Inventor

By Henry Schreiter, his Attorney

J. M. BURBY.
APPARATUS FOR REMOVING IMPURITIES FROM PULPED WASTE PAPERS.
APPLICATION FILED APR. 28, 1911.
1,013,529.
Patented Jan. 2, 1912.
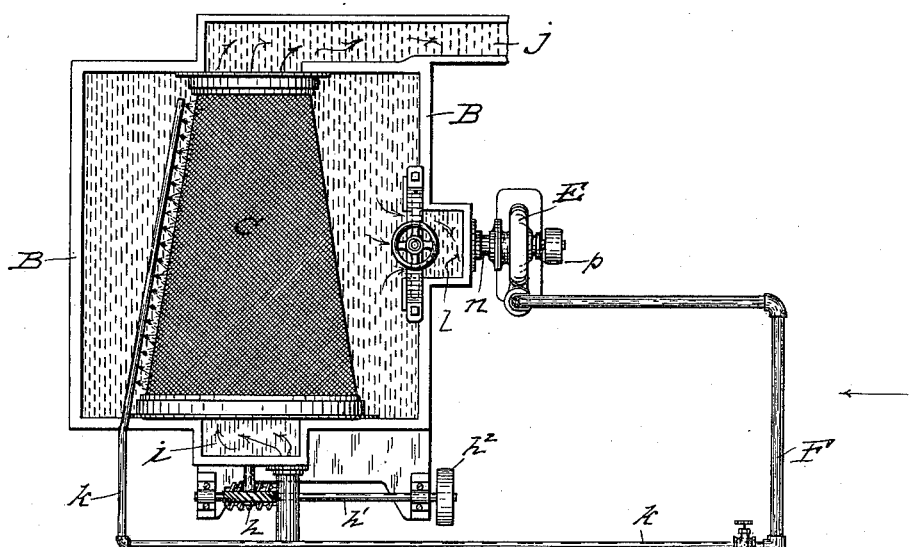
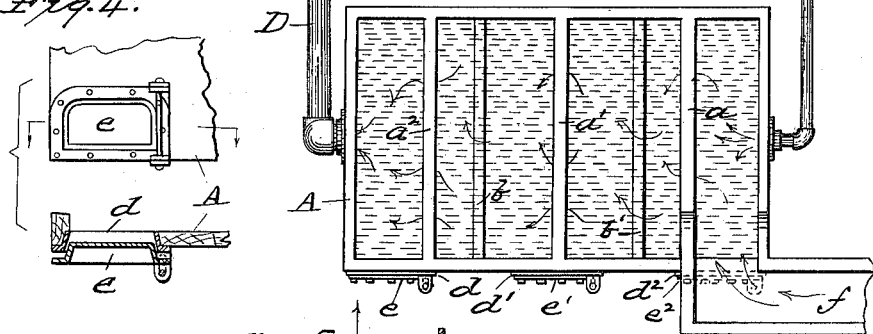
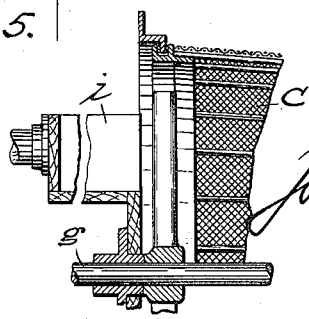

UNITED STATES PATENT OFFICE.

JOHN M. BURBY, OF ASTORIA, NEW YORK.

APPARATUS FOR REMOVING IMPURITIES FROM PULPED WASTE PAPERS.

1,013,529. Specification of Letters Patent. Patented Jan. 2, 1912.

Application filed April 28, 1911. Serial No. 623,819.

*To all whom it may concern:*

Be it known that I, JOHN M. BURBY, a citizen of the United States, and a resident of Astoria, Long Island, county of Queens, and State of New York, have invented certain new and useful Improvements in Apparatus for Removing Impurities from Pulped Waste Papers, of which the following is a full, clear, and exact specification.

The supply of waste papers, used for manufacture of paper-boards, is collected from refuse of factories, stores, dwellings, etc., and contains a considerable proportion of dirt and other impurities. The usual procedure followed is to roughly sort and sift such waste papers, feed them into a beating engine, where they are macerated, and then to pass the stuff through jordans or refining engines, wherein they are so finely pulped as required for manufacture of such paperboards. In the course of the preparatory treatment of such waste papers it is next to impossible to eliminate therefrom such substances as nails, fragments of metal, small stones and the like, and these are carried with the flow of the stuff from the beating engines into the refining engines, breaking up their knives and beds, and causing, besides the damage to the refining engines, also frequent stopping of the work and otherwise interfering with the proper operation of the machinery.

The object of my invention is to eliminate such impurities from the pulped waste paper material before the same is delivered into the refining engines, and to this end, I have designed the separating apparatus shown in the accompanying drawings, wherein—

Figure 1:
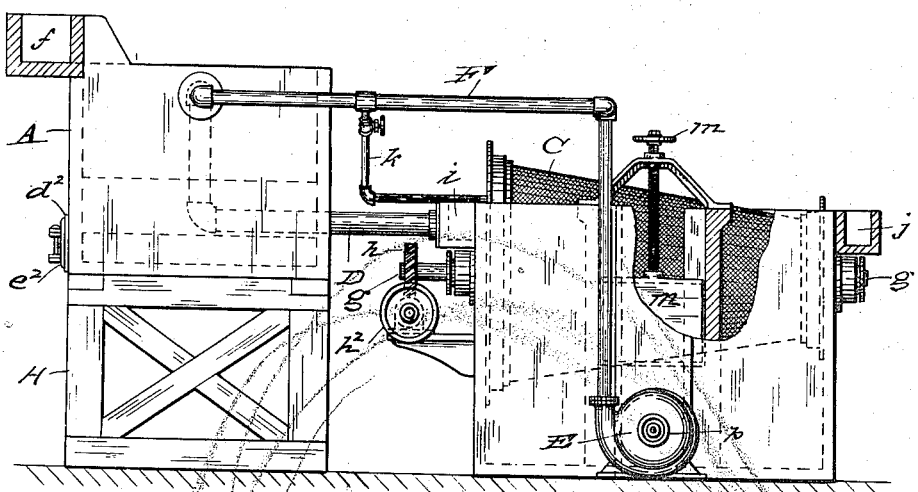
Figure 2:
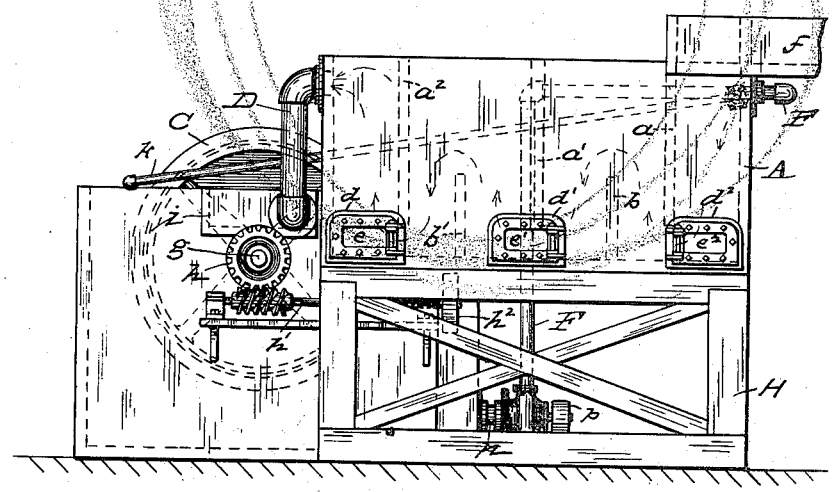

Figure 1 is a side elevation; Fig. 2 a front elevation, and Fig. 3 a plan view thereof; Figs. 4 and 5 are fractional detail views, Fig. 4 being an elevation and a cross-sectional view of one of the manhole doors of the settling box, and Fig. 5 a longitudinal sectional view, showing the mounting of the screen in the wash-box.

This apparatus is designed to utilize the principle, that by reducing the density of the pulped material, and by reducing the velocity of its flow, such impurities are precipitated, and that by interposing partitions, in the bottom of the vessel, through which the diluted material flows, the precipitated impurities are collected; also that the finely divided impurities, such as clay filler, dust, etc., as may be carried, mixed with, or adhering to, the pulp fibers, may then be eliminated by screening. The herein shown and described apparatus is also designed with the further object in view, that its operation should be continuous, that the water, required for its operation, should be used over and over again, and that the apparatus should deliver the pulped material in as thick or thin flow as may be required in the manufacture of any particular kind or grade of board.

The apparatus, which is equally suitable for removing such impurities from pulped rags and other similar materials used in manufacture of blotting, roofing and building papers and the like, consists essentially of a settling box A, provided with partitions $a$, $a'$, etc., and $b$, $b'$, etc., a wash box B, a screen C, rotatably mounted therein; the connecting conduit D from the settling-box A to the wash-box B, a pump E, a water conduit F from the pump E to the settling-box A, a driving gear for the pump and of mechanism for rotating the screen. The size of the apparatus and the dimensions of its parts are determined by the quantity of the pulped material to be treated.

The settling-box A may be constructed of suitable lumber, of any requisite size, according to the quantity of material to be treated. The partitions $a$, $a'$ and $a^2$ are to be made flush with the top edge of the box and to extend to a line about one-fourth of the depth of the box above the bottom thereof, leaving a free passage underneath and the partitions $b$ and $b'$ are set upon the bottom of the box, extending upward to about from one-third to two-fifths of the depth of the box. The object of the partitions $a$, $a'$ and $a^2$ is to detain and to deflect the flow of the pulped material through the box A from the end, where the trough $f$ discharges into it, toward the conduit D, as indicated by arrows in Figs. 2 and 3, and the object of the partitions $b$ and $b'$ is to retain the precipitated impurities. Manholes $d$, $d'$ and $d^2$ are provided to afford access, one to each of the divisions of the settling-box A, as they are made by setting up the partitions $b$ and $b'$, to facilitate the removal of the accumulated impurities. These manholes $d$, $d'$, etc., are closed by doors $e$, $e'$ and $e^2$, hinged to the side of box A as shown in Fig. 4. A trough $f$, or other means for the delivery of the pulped material into the box A, at one end thereof, is provided, and the conduit D is connected to its other end.

The settling-box A is preferably set upon a frame H, above wash-box B, so the flow of the pulped material into the wash-box B will be actuated by gravity, and its bottom may be made sloping toward the side where the manholes $d$, $d'$ and $d^2$, etc., are located, to facilitate withdrawing of the impurities. The wash-box B may be a tank of any suitable shape, constructed of lumber or other material and should be of a size corresponding proportionately to that of the settling box A. The overflow sluice $l$ and an adjustable gate $m$ are arranged on one side of the wash-box B for regulating the level of the water therein and to prevent the sediment from being drawn up by the pump E, the construction and the arrangement whereof are shown in Figs. 1 and 3. Pump E, preferably of the rotary fan type, is connected with the sluice $l$ by pipe $n$, and is driven by a belt running from a transmission over pulley $p$. The discharge end of pump E connects with conduit F, through which the water, drawn by the pump, is delivered into the settling-box A, at the end where the pulped material flows into it.

The screen C, rotatably mounted in the wash-box B on shaft $g$, is funnel-shaped to facilitate the draining of the surplus water from the pulped material during its progress therethrough. The screen is made of wire netting strung on wires in the usual manner; a more particular description of the details of the construction of this screen, and of the manner of its mounting in the wash-box B, are not considered necessary, the latter being shown in detail in Fig. 5, and both being known and employed in the art. For rotating the screen, a worm-gear $h$ is provided, the worm-shaft $h'$ being driven by a belt running from a transmission over pulley $h^2$ mounted thereon. The conduit D connects with, and discharges into, the trough $i$, opening into the wider end of screen C, and trough $j$ is provided on the other end of wash-box B, the other end of the screen C opening into it. This trough $j$ slopes toward a chest or the refining engine, so that the pulped material, discharged from the screen C flows continuously away, propelled by gravity. A sprinkler-pipe $k$, connecting with the conduit F, runs parallel to the screen C and a number of orifices, or nozzles of suitable size, are made therein on the side toward the screen C, to discharge streams of water upon the screen, washing and keeping open its meshes. By the rotating of screen C, the pulped material, delivered into it, is agitated and washed in the water contained in the box B. During its passage through the screen the pulped material is again gradually drained, the proportionate quantity of water to be retained therein being regulated by raising or lowering the level of water in the box B. This is effected by raising or lowering the gate $m$ as required. The higher this gate is set, the higher level of water is maintained in the box B, and the higher the level of the water in the box B, the smaller proportion of water is drained off, from the pulped material discharged from the screen C into the trough $j$, and vice versa. The water, employed in the apparatus is circulated and used over again, and while it may be necessary to replenish the supply of water from time to time, its total consumption is comparatively insignificant. The pulped material discharged from the screen C into the trough $j$ will be found free from all foreign materials and impurities.

The removal of impurities from the pulped material is carried on in the apparatus as follows: At the start of the operation both boxes A and B are filled with water, the wash-box B to the level of the gate $m$ and the settling-box A to about two-thirds of its depth; next the pulped material is started to flow through the trough $f$ into the box A, where it is diluted by the water contained therein, and when the settling-box A is nearly filled, the rotating screen C and the pump E are set in motion. The pulped material may be so diluted in the settling-box A that practically only the fibers, disintergrated parts of the waste papers, and whatever filler may be adhering thereto, are held suspended in the water; all foreign substances particularly the mineral and metallic impurities sinking to the bottom of the box. The pulped material, suspended in the water, flows through the conduit D into the trough $i$ and from there into the interior of the screen C, where it is still more diluted by the water contained in the wash-box B, and agitated by the revolutions of the screen. By this treatment, particles of filler or dirt, adhering to the fibers, are shaken off and drop through the screen to the bottom of the box. The surplus water is again gradually drained off, from the pulped material, as it progresses toward the narrower end of screen C, from where it is discharged into trough $j$, by which it may be conveyed directly to the refining engine, where it is reground.

The proportionate quantity of water contained in pulped material, discharged from the screen C, should be of about the same as it contained when it was delivered into the settling-box. The impurities accumulating in the settling-box A are from time to time removed through the manholes

$d$, $d'$, etc.; this, however, need not be done frequently, once or twice in a week will be found sufficient.

I claim as my invention:

1. An apparatus for removing impurities from pulped papers and similar material comprising a receptacle, means for conveying the pulped material into the receptacle, partitions set therein transversely to the flow of the material therethrough; a tank; a screen rotatably mounted therein, and means for rotating the screen; a conduit from the receptacle into the screen; a pump connected with the tank; and a conduit from the pump into the receptacle; substantially as herein shown and described.

2. An apparatus for removing impurities from pulped papers and similar material comprising a receptacle, means for conveying the pulped material into the receptacle, partitions set therein transversely to the flow of the material therethrough; a tank and means for regulating the level of water therein; a screen rotatably mounted in the tank and means for rotating the screen; a conduit from the receptacle into the screen; a pump connected with the tank; and a conduit from the pump into the receptacle; substantially as herein shown and described.

3. An apparatus for removing impurities from pulped materials, comprising a receptacle, means for delivering the pulped material into the receptacle; a tank and means for maintaining a predetermined level of water therein; a screen, rotatably mounted in the tank and means for rotating the screen; a conduit connecting the discharge end of the receptacle with the intake end of the screen, and means for drawing the water from the tank and for delivering the same into the receptacle, substantially as herein shown and described.

4. An apparatus for removing impurities from pulped materials, comprising a receptacle; a series of partitions set therein transversely to a line from its inlet to its outlet; means for delivering the pulped material into the receptacle; a tank and means for maintaining a predetermined level of water therein; a screen, rotatably mounted in the tank and means for rotating the screen; a conduit connecting the outlet of the receptacle with the intake end of the screen, and means for drawing water from the tank and delivering the same into the inlet of the receptacle; substantially as herein shown and described.

5. An apparatus for removing impurities from pulped materials, comprising a receptacle; a series of partitions set therein transversely to a line from its inlet to its outlet; means for delivering the pulped material into the receptacle; a tank and means for maintaining a predetermined level of water therein; a screen, rotatably mounted in the tank and means for rotating the screen; a sprinkler set along the screen and connected to a supply of water under pressure; a conduit connecting the outlet of the receptacle with the intake end of the screen, and means for drawing water from the tank and delivering the same into the inlet of the receptacle; substantially as herein shown and described.

6. An apparatus for removing impurities from pulped materials, comprising a receptacle; a series of partitions set upon the bottom of the receptacle transversely to a line from its inlet to its outlet; means for delivering the pulped material into the receptacle, a tank and means for maintaining water therein at a predetermined level; an outlet pipe connecting with the tank; a pump connected therewith and a conduit from the pump into the inlet end of the receptacle; a screen, rotatably mounted in the tank, and means for rotating the screen; a conduit connecting the outlet of the receptacle with the intake end of the screen; and a trough connecting with the discharge end of the screen, substantially as herein shown and described.

JOHN M. BURBY.

Witnesses:
JOHN H. HENSHAW,
V. BRAUN.